(12) United States Patent
Lee et al.

(10) Patent No.: US 12,206,119 B2
(45) Date of Patent: Jan. 21, 2025

(54) POUCH FOR SECONDARY BATTERY AND POUCH TYPE SECONDARY BATTERY

(71) Applicant: LG Chem, Ltd., Seoul (KR)

(72) Inventors: Han Young Lee, Daejeon (KR); Sun Kyu Kim, Daejeon (KR); Bum Young Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 917 days.

(21) Appl. No.: 17/043,990

(22) PCT Filed: Dec. 11, 2019

(86) PCT No.: PCT/KR2019/017512
§ 371 (c)(1),
(2) Date: Sep. 30, 2020

(87) PCT Pub. No.: WO2020/179990
PCT Pub. Date: Sep. 10, 2020

(65) Prior Publication Data
US 2021/0036271 A1    Feb. 4, 2021

(30) Foreign Application Priority Data

Mar. 4, 2019 (KR) .................. 10-2019-0024846

(51) Int. Cl.
*H01M 50/124* (2021.01)
*H01M 50/10* (2021.01)
(Continued)

(52) U.S. Cl.
CPC ......... *H01M 50/124* (2021.01); *H01M 50/10* (2021.01); *H01M 50/105* (2021.01);
(Continued)

(58) Field of Classification Search
CPC ............. H01M 50/124; H01M 50/141; H01M 50/116; H01M 50/105; H01M 50/10; H01M 50/1245; H01M 50/588
See application file for complete search history.

(56) References Cited

U.S. PATENT DOCUMENTS 6,207,271 B1    3/2001   Daroux et al.
2006/0083984 A1   4/2006   Oh et al.
(Continued)

FOREIGN PATENT DOCUMENTS

CN    103907219 A    7/2014
CN    105594012 A    5/2016
(Continued)

OTHER PUBLICATIONS

Tokoro et al. (Nat. Commun. 6:7037 (2015)) (Year: 2015).*
(Continued)

*Primary Examiner* — Brian R Ohara
*Assistant Examiner* — Emily Elizabeth Freeman
(74) *Attorney, Agent, or Firm* — Lerner David LLP

(57) ABSTRACT

A pouch for a secondary battery according to an embodiment of the present invention for solving the above problem includes: a surface protection layer made of a first polymer and formed at the outermost layer; a sealant layer made of a second polymer and formed at the innermost layer; a gas barrier layer made of a metal and stacked between the surface protection layer and the sealant layer; and a heat dissipation layer made of ceramic, stacked between the surface protection layer and the sealant layer, and configured to release heat to the outside of the pouch when a predetermined pressure is applied thereto.

12 Claims, 7 Drawing Sheets

(51) Int. Cl.
  *H01M 50/105* (2021.01)
  *H01M 50/116* (2021.01)
  *H01M 50/141* (2021.01)
  *H01M 50/588* (2021.01)

(52) U.S. Cl.
  CPC ..... *H01M 50/116* (2021.01); *H01M 50/1245* (2021.01); *H01M 50/141* (2021.01); *H01M 50/588* (2021.01)

(56) References Cited

U.S. PATENT DOCUMENTS

| | | | | |
|---|---|---|---|---|
| 2012/0034541 | A1* | 2/2012 | Muraoka | H01M 8/1011 |
| | | | | 429/456 |
| 2012/0301777 | A1 | 11/2012 | Ahn | |
| 2014/0255765 | A1 | 9/2014 | Akita et al. | |
| 2016/0211491 | A1 | 7/2016 | Iwasaki et al. | |
| 2016/0237331 | A1 | 8/2016 | Ohkoshi et al. | |
| 2018/0219247 | A1 | 8/2018 | Park | |
| 2019/0048243 | A1 | 2/2019 | Ohkoshi et al. | |
| 2019/0143646 | A1* | 5/2019 | Ogiwara | H01M 50/117 |
| | | | | 428/458 |
| 2022/0115723 | A1* | 4/2022 | Yasuda | H01G 11/78 |

FOREIGN PATENT DOCUMENTS

| | | |
|---|---|---|
| CN | 206849962 U | 1/2018 |
| JP | 2007107048 A | 4/2007 |
| JP | 2010067524 A | 3/2010 |
| JP | 2014170720 A | 9/2014 |
| JP | 2015092456 A | 5/2015 |
| JP | 2018181521 A | 11/2018 |
| KR | 20060034130 A | 4/2006 |
| KR | 20120132341 A | 12/2012 |
| KR | 101405621 B1 * | 6/2014 |
| KR | 20140148121 A * | 12/2014 |
| KR | 20150062783 A | 6/2015 |
| KR | 20170142622 A | 12/2017 |
| KR | 20170142624 A | 12/2017 |
| KR | 20180090100 A | 8/2018 |
| KR | 20190012059 A | 2/2019 |

OTHER PUBLICATIONS

Extended European Search Report including Written Opinion for Application No. 19917693.4 dated Apr. 30, 2021, pp. 1-9.
Search Report dated Nov. 18, 2022 from the Office Action for Chinese Application No. 202010140049.2 issued Nov. 24, 2022, pp. 1-2.
Search Report dated May 5, 2022 from Office Action for Chinese Application No. 202010140049.2 issued May 11, 2022. 3 pgs.
Hiroko, et al., "External stimulation-controllable heat-storage ceramics," Nature Communications, May 12, 2015, pp. 1-8, vol. 6, No. 1.
International Search Report for Application No. PCT/KR2019/017512 mailed Mar. 31, 2020, 2 pages.

* cited by examiner

POUCH FOR SECONDARY BATTERY AND POUCH TYPE SECONDARY BATTERY

CROSS-REFERENCE TO RELATED APPLICATION

The present application is a national phase entry under 35 U.S.C. § 371 of International Patent Application No. PCT/KR2019/017512, filed on Dec. 11, 2019, published in Korean, which claims priority to Korean Patent Application No. 10-2019-0024846, filed on Mar. 4, 2019, the disclosures of which are hereby incorporated by reference in their entireties.

TECHNICAL FIELD

The present invention relates to a pouch for a secondary battery and a pouch type secondary battery, and more particularly, to a pouch for a secondary battery, which is capable of preventing lithium plating from occurring even if over-voltage occurs at a low temperature, and a pouch type secondary battery.

BACKGROUND ART

In general, secondary batteries include nickel-cadmium batteries, nickel-hydrogen batteries, lithium ion batteries, and lithium ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

In order to manufacture an electrode assembly, a cathode, a separator, and an anode are manufactured and stacked. Specifically, cathode active material slurry is applied to a cathode collector, and anode active material slurry is applied to an anode collector to manufacture a cathode and an anode. Also, when the separator is interposed and stacked between the manufactured cathode and anode, unit cells are formed. The unit cells are stacked on each other to form an electrode assembly. Also, when the electrode assembly is accommodated in a specific case, and an electrolyte is injected, the secondary battery is manufactured.

Conventionally, when over-voltage occurs at a low temperature, lithium plating occurs on the anode, thereby increasing in thickness of the electrode assembly. Accordingly, there are problems that the pouch type secondary battery increases in total thickness, assembly quality of the secondary battery is deteriorated, and energy efficiency to volume is reduced.

DISCLOSURE OF THE INVENTION

Technical Problem

An object of the present invention is to provide a pouch for a secondary battery, which is capable of preventing lithium plating from occurring even if an over-voltage occurs at a low temperature, and a pouch type secondary battery.

The objects of the present invention are not limited to the aforementioned object, but other objects not described herein will be clearly understood by those skilled in the art from descriptions below.

Technical Solution

A pouch for a secondary battery according to an embodiment of the present invention for solving the above problem includes: a surface protection layer made of a first polymer and formed at the outermost layer; a sealant layer made of a second polymer and formed at the innermost layer; a gas barrier layer made of a metal and stacked between the surface protection layer and the sealant layer; and a heat dissipation layer made of ceramic, stacked between the surface protection layer and the sealant layer, and releasing heat to the outside when a specific pressure is applied thereto.

Also, the ceramic may include lambda trititanium pentoxide.

Also, the ceramic may be converted into beta trititanium pentoxide when a pressure greater than 60 MPa is applied.

Also, the gas barrier layer may be provided in plurality.

Also, the heat dissipation layer may be stacked between the plurality of gas barrier layers.

Also, the heat dissipation layer may be stacked inside the gas barrier layer.

Also, the surface protection layer may be provided in plurality.

Also, the plurality of surface protection layer may include: a first surface protection layer made of PET and formed at the outermost layer; and a second surface protection layer made of nylon and stacked inside the first surface protection layer.

Also, the sealant layer may be provided in plurality.

Also, the plurality of sealant layers may include: a first sealant layer made of PPa and formed at the innermost layer; and a second sealant layer made of CPP and stacked outside the first sealant layer.

A pouch type secondary battery according to an embodiment of the present invention for solving the above problem includes: an electrode assembly in which electrodes and a separator are alternately stacked; and a pouch type secondary battery case configured to accommodate the electrode assembly, wherein the battery case includes: a surface protection layer made of a first polymer and formed at the outermost layer; a sealant layer made of a second polymer and formed at the innermost layer; a gas barrier layer made of a metal and stacked between the surface protection layer and the sealant layer; and a heat dissipation layer made of ceramic, stacked between the surface protection layer and the sealant layer, and releasing heat to the outside when a specific pressure is applied thereto.

Also, the ceramic may include lambda trititanium pentoxide.

Also, the gas barrier layer may be provided in plurality.

Also, the heat dissipation layer may be stacked between the plurality of gas barrier layers.

Particularities of other embodiments are included in the detailed description and drawings.

Advantageous Effects

The embodiments of the present invention may have at least the following effects.

The pouch for the secondary battery may include the heat dissipation layer made of ceramic containing lambda trititanium pentoxide, and when pressure is applied, the heat may be released to the outside to increase in temperature, thereby preventing the lithium plating from occurring even if the over-voltage occurs at the low temperature.

The effects of the prevent invention are not limited by the aforementioned description, and thus, more varied effects are involved in this specification.

MODE FOR CARRYING OUT THE INVENTION

Figure 1:
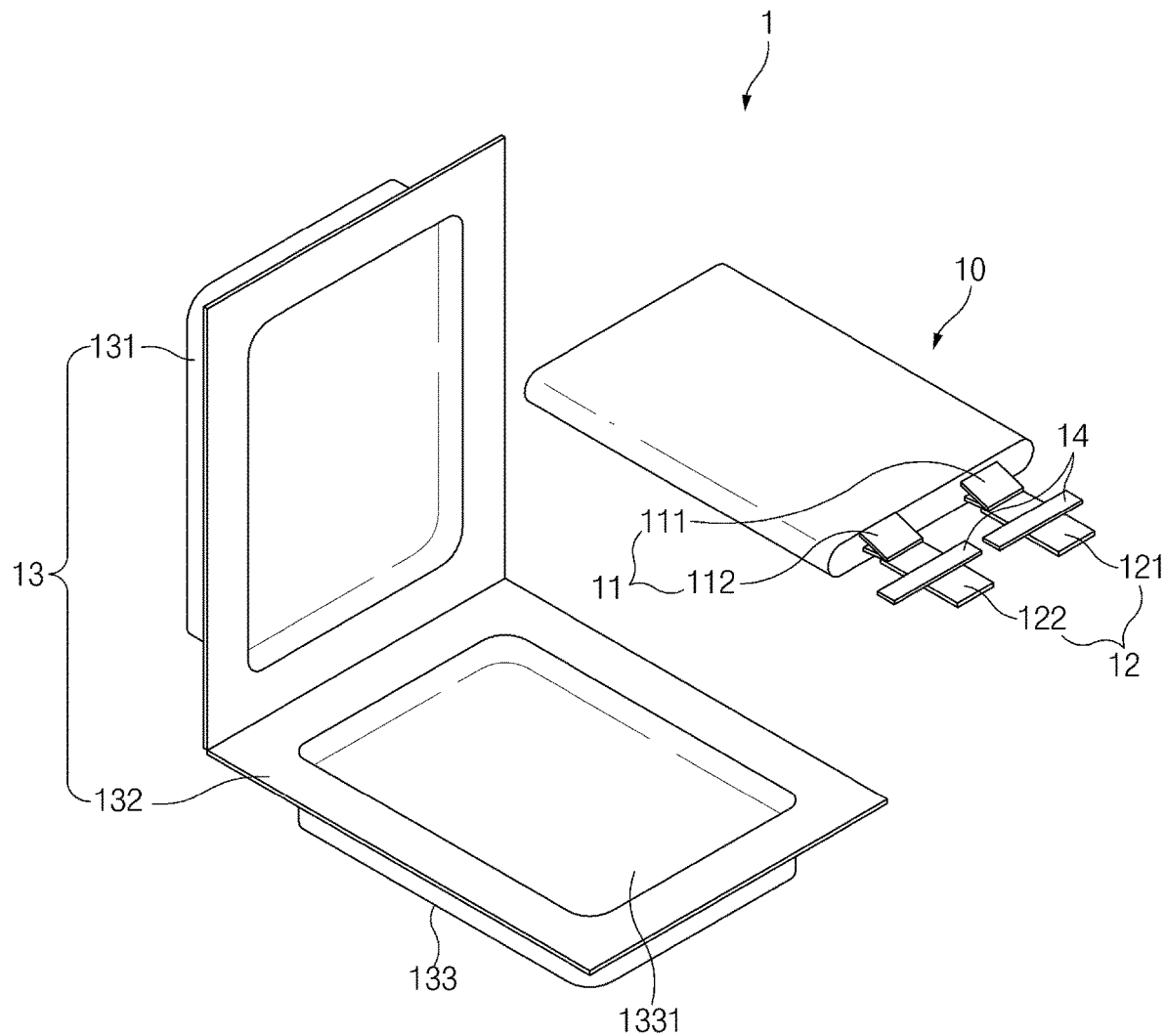
FIG. 1 is an assembled view of a pouch type secondary battery according to an embodiment of the present invention.

Advantages and features of the present invention, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present invention. In this specification, the terms of a singular form may include plural forms unless specifically mentioned. The meaning of "comprises" and/or "including" does not exclude other components besides a mentioned component.

Hereinafter, preferred embodiments will be described in detail with reference to the accompanying drawings.

FIG. 1 is an assembled view of a pouch type secondary battery according to an embodiment of the present invention.

As illustrated in FIG. 1, a pouch type secondary battery 1 according to an embodiment of the present invention includes a pouch type battery case 13 and an electrode assembly 10 accommodated in the battery case 13.

The electrode assembly 10 may be a stacked structure including two electrodes such as a cathode and an anode and a separator interposed between the electrodes to insulate the electrodes from each other or disposed at a left or right side of one electrode. The stacked structure may have various shapes without being limited in shape. For example, the cathode and the anode, each of which has a predetermined standard, may be stacked with the separator therebetween, or the stacked structure may be wound in the form of a jelly roll. Each of the two electrodes has a structure in which active material slurry is applied to a metal foil or a mesh-shaped collector including aluminum and copper. The slurry may be usually formed by agitating a granular active material, an auxiliary conductor, a binder, and a plasticizer with a solvent added. The solvent may be removed in the subsequent process.

As illustrated in FIG. 1, the electrode assembly 10 includes the electrode tabs 11. The electrode tab 11 is connected to each of a cathode and an anode of the electrode assembly 10 to protrude to the outside of the electrode assembly 10, thereby providing a path, through which electrons are moved, between the inside and outside of the electrode assembly 10. A collector of the electrode assembly 10 is constituted by a portion coated with an electrode active material and a distal end, on which the electrode active material is not applied, i.e., a non-coating portion. Also, each of the electrode tabs 11 may be formed by cutting the non-coating portion or by connecting a separate conductive member to the non-coating portion through ultrasonic welding. As illustrated in FIG. 1, the electrode tabs 11 may protrude from one side of the electrode assembly 10 in the same direction, but the present invention is not limited thereto. For example, the electrode tabs 11 may protrude in directions different from each other.

In the electrode assembly 10, the electrode lead 12 is connected to the electrode tab 11 through spot welding. Also, a portion of the electrode lead 12 is surrounded by an insulation part 14. The insulation part 14 may be disposed to be limited within a sealing part, at which an upper pouch 131 and a lower pouch 132 are thermally fused, so as to be bonded to the battery case 13. Also, electricity generated from the electrode assembly 10 may be prevented from flowing to the battery case 13 through the electrode lead 12, and the sealing of the battery case 13 may be maintained. Thus, the insulation part 14 may be made of a nonconductor having non-conductivity, which is not electrically conductive. In general, although an insulation tape which is easily attached to the electrode lead 12 and has a relatively thin thickness is mainly used as the insulation part 14, the present invention is not limited thereto. For example, various members may be used as the insulation part 14 as long as the members are capable of insulating the electrode lead 12.

The electrode lead 12 may extend in the same direction or extend in directions different from each other according to the formation positions of the cathode tab 111 and the anode tab 112. The cathode lead 121 and the anode lead 122 may be made of materials different from each other. That is, the cathode lead 121 may be made of the same material as the cathode plate, i.e., an aluminum (Al) material, and the anode lead 122 may be made of the same material as the anode plate, i.e., a copper (Cu) material or a copper material coated with nickel (Ni). Also, a portion of the electrode lead 12, which protrudes to the outside of the battery case 13, may be provided as a terminal part and electrically connected to an external terminal.

The battery case 13 is a pouch made of a flexible material. Also, the battery case 13 accommodates the electrode assembly 10 so that a portion of the electrode lead 12, i.e., the terminal part is exposed and then is sealed. As illustrated in FIG. 1, the battery case 13 includes the upper pouch 131 and the lower pouch 132. An accommodation space 1331 in which a cup part 133 is formed to accommodate the electrode assembly 10 may be provided in the lower pouch 132, and upper pouch 131 may cover an upper side of the accommodation space 1331 so that the electrode assembly 10 is not separated to the outside of the battery case 13. Although the cup part 133 is formed in only the lower pouch 132 in FIG. 1, the present invention is not limited thereto. For example, the cup part 133 may be variously formed, for example, formed in the upper pouch. As illustrated in FIG. 1, one side of the upper pouch 131 and one side of the lower pouch 132 may be connected to each other. However, the present invention is not limited thereto. For example, the upper pouch 131 and the lower pouch may be separately manufactured to be separated from each other.

When the electrode lead 12 is connected to the electrode tab 11 of the electrode assembly 10, and the insulation part 14 is provided on a portion of the electrode lead 12, the electrode assembly 10 may be accommodated in the accommodation space provided in the cup part 133 of the lower pouch 132, and the upper pouch 131 may cover an upper portion of the accommodation space. Also, the electrolyte is injected, and the sealing part provided on an edge of each of the upper pouch 131 and the lower pouch 132 is sealed. The electrolyte may move lithium ions generated by electrochemical reaction of the electrode during charging and discharging of the secondary battery 1. The electrolyte may include a non-aqueous organic electrolyte that is a mixture of a lithium salt and a high-purity organic solvent or a polymer using a polymer electrolyte. The pouch type secondary battery 1 may be manufactured through the above-described method.

Figure 2:
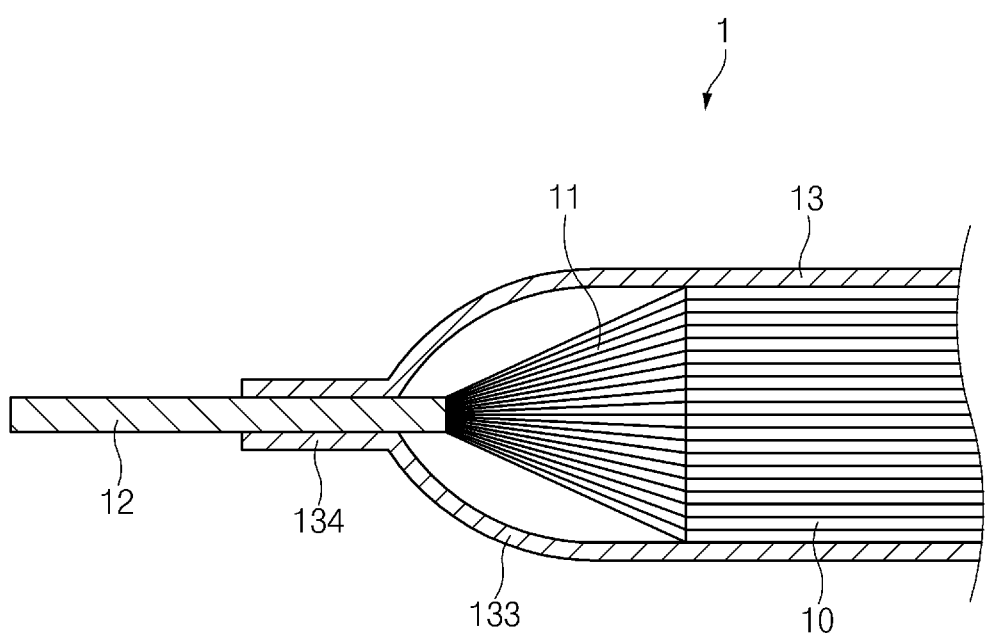
FIG. 2 is an enlarged cross-sectional view of the pouch type secondary battery according to an embodiment of the present invention.
Figure 3:
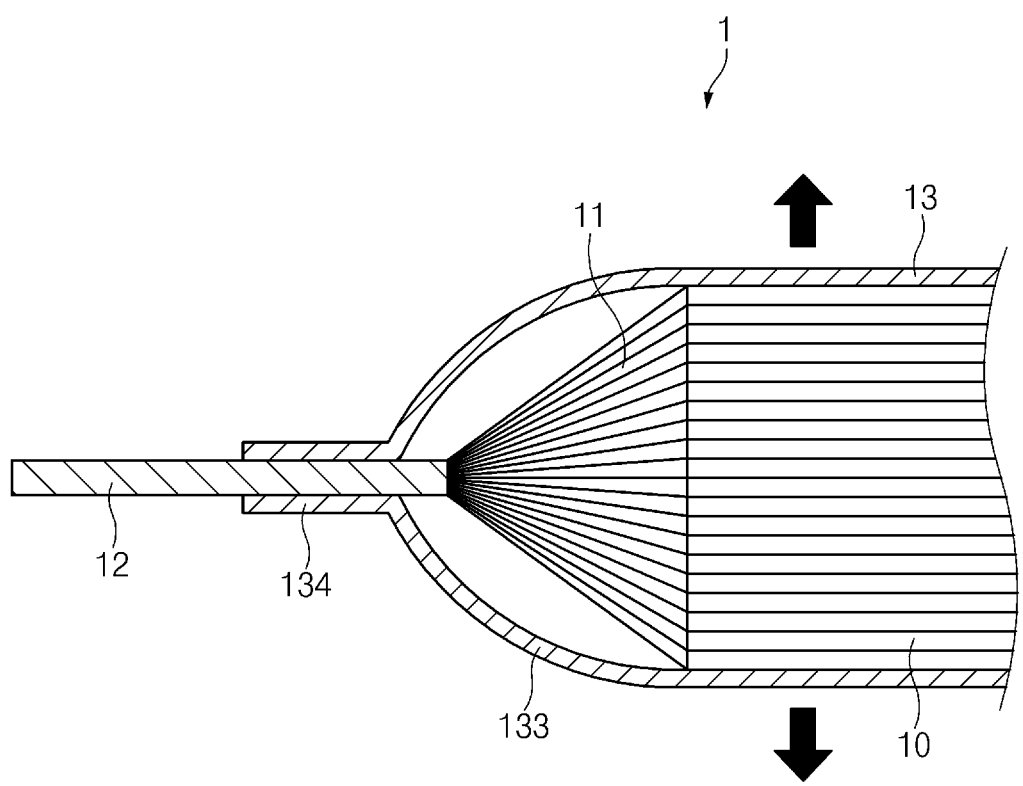
FIG. 3 is an enlarged cross-sectional view illustrating a state in which the pouch type secondary battery increases in thickness according to an embodiment of the present invention.

FIG. 2 is an enlarged cross-sectional view of the pouch type secondary battery 1 according to an embodiment of the present invention, and FIG. 3 is an enlarged cross-sectional view illustrating a state in which the pouch type secondary battery 1 increases in thickness according to an embodiment of the present invention.

As described above, when an over-voltage occurs at a low temperature, a charging current density increases, and thus lithium ions of the cathode are not rapidly accommodated in an anode active material coating layer. As a result, the lithium ions are accumulated on the surface of the anode and are precipitated as metallic lithium. This is called lithium plating.

When the lithium plating occurs on the anode, the electrode assembly 10 increases in thickness as illustrated in FIG. 3. Accordingly, the pouch type secondary battery 1 may increase in total thickness to deteriorate assembly quality of the secondary battery 1 and reduce energy efficiency to volume.

Figure 4:
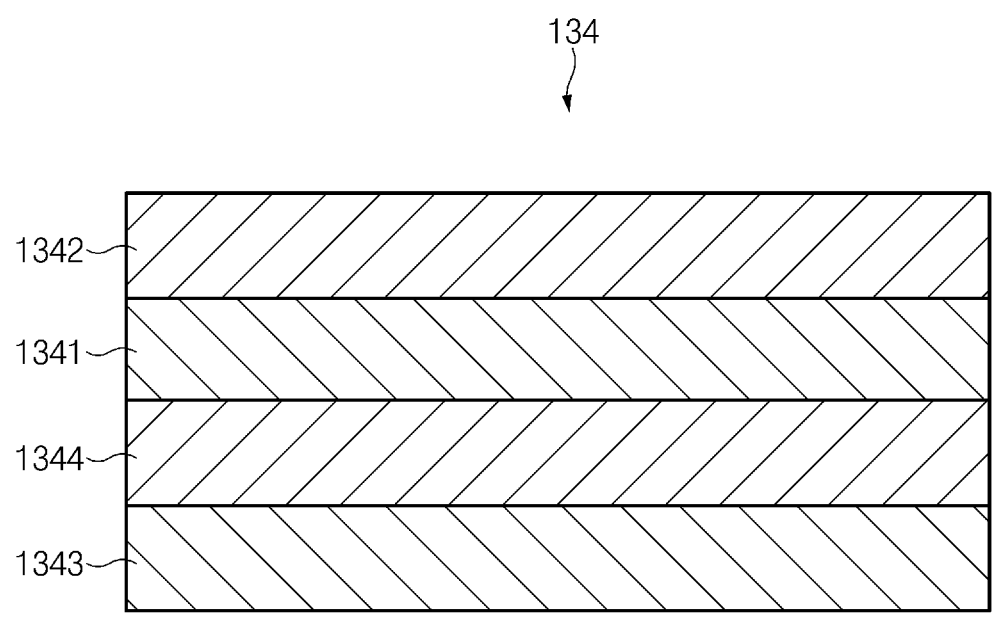
FIG. 4 is a cross-sectional view of a pouch film according to an embodiment of the present invention.

FIG. 4 is a cross-sectional view of a pouch film 134 according to an embodiment of the present invention.

According to an embodiment of the present invention, the pouch for the secondary battery may include a heat dissipation layer 1344 made of ceramic containing lambda trititanium pentoxide, and when a pressure is applied, heat may be released to the outside to increase in temperature, thereby preventing the lithium plating from occurring even if the over-voltage occurs at the low temperature.

For this, the pouch for the secondary battery according to an embodiment of the present invention includes a surface protection layer 1342 made of a first polymer and formed on the outermost layer; a sealant layer 1343 made of a second polymer and formed on the innermost layer; a gas barrier layer 1341 made of a metal and stacked between the surface protection layer 1342 and the sealant layer 1343; and a heat dissipation layer 1344 made of ceramic, stacked between the surface protection layer 1342 and the sealant layer 1343, and releasing heat to the outside when a specific pressure is applied thereto. Also, the ceramic may be lambda trititanium pentoxide and be converted into beta trititanium pentoxide when a pressure greater than 60 MPa is applied.

The pouch that is the battery case 13 of the pouch type secondary battery 1 according to an embodiment of the present invention may be manufactured by drawing the pouch film 134. That is, the pouch film 134 is elongated by using a punch or the like to form a cup part 133, thereby manufacturing the pouch 13. According to an embodiment of the present invention, as illustrated in FIG. 4, the pouch film 134 includes the gas barrier layer 1341, the surface protection layer 1342, and the sealant layer 1343.

The gas barrier layer 1341 may secure mechanical strength of the pouch 13, block introduction and discharge of a gas or moisture outside the secondary battery 1, and prevent an electrolyte from leaking. In general, the gas barrier layer 1341 is made of a metal, and the metal may include aluminum. Aluminum may secure the mechanical strength having a predetermined level or more, but be light in weight. Thus, aluminum may secure complement and heat dissipation for electrochemical properties due to the electrode assembly 10 and the electrolyte. However, the present invention is not limited thereto. For example, the gas barrier layer 1341 may be made of various materials. For example, the gas barrier layer 1341 may be made of one material or a mixture of two or more materials selected from the group consisting of Fe, Cr, Mn, Ni and Al. Here, the gas barrier layer 1341 is made of a material containing iron, the mechanical strength may be improved. When the gas barrier layer 1351 is made of a material containing aluminum, flexibility may be improved. Thus, the material forming the gas barrier layer 1351 may be used in consideration of the characteristics of the gas barrier layer 1351.

If the gas barrier layer 1341 is made of aluminum, the gas barrier layer 1341 may have a thickness of about 30 μm to about 80 μm. If the gas barrier layer 1341 has a thickness less than 30 μm, the gas barrier layer 1341 is excessively thin to cause deterioration in moldability and generate a large number of pinholes, thereby deteriorating battery quality. On the contrary, if the gas battier layer has a thickness greater than 80 μm, the total thickness of the pouch is thick to increase in volume of the secondary battery and deteriorate in energy density. More preferably, the gas barrier layer 1341 may have a thickness of 30 μm to 50 μm.

The surface protection layer 1342 is made of the first polymer and disposed at the outermost layer to protect the secondary battery 1 against external friction and collision and also electrically insulates the electrode assembly 10 from the outside. Here, the outermost layer represents a layer disposed at the last when oriented in a direction opposite to the direction in which the electrode assembly 10 is disposed with respect to the gas barrier layer 1341. The first polymer forming the surface protection layer 1342 may include at least one or more materials selected from the group consisting of polyethylene, polypropylene, polycarbonate, polyethylene terephthalate (PET), polyvinyl chloride, acrylic polymer, polyacrylonitrile, polyimide, polyamide, cellulose, aramid, nylon, polyester, polyparaphenylene benzobisoxazole, polyarylate, teflon, and glass fiber. Particularly, a polymer such as a nylon resin or polyethylene terephthalate (PET) having mainly abrasion resistance and heat resistance is used.

The surface protection layer 1342 may have a thickness of 12 μm to 25 μm if made of PET. If the surface protection layer 1342 has a thickness less than 2 μm, external insulation may be deteriorated, and adhesion with the gas barrier layer 1341 may be deteriorated. On the contrary, if the surface protection layer 1342 has a thickness greater than 25 μm, the total thickness of the pouch is thick to increase in volume of the secondary battery and deteriorate in energy density. More preferably, the surface protection layer 1342 may have a thickness of 20 to 25 μm.

The surface protection layer 1342 may have a single layer structure made of any one material or may be provided in plurality. That is, the surface protection layer 1342 may have a composite layer structure which is constituted by layers respectively made of two or more materials. In this case, the plurality of surface protection layers 1342 may include a first surface protection layer made of polyethylene terephthalate (PET) and formed at the outermost layer and a second surface protection layer made of nylon and stacked inside the first surface protection layer.

The sealant layer 1343 is made of the second polymer and disposed at the innermost layer to directly contact the electrode assembly 10. Here, the innermost layer represents a layer disposed at the last when oriented in a direction opposite to the direction in which the electrode assembly 10 is disposed with respect to the gas barrier layer 1341. In the pouch, when the pouch film 134 having a stacked structure as described above is drawn using a punch, a portion of the pouch film 134 is elongated to form a cup part 133 including an accommodation space 1331 having a bag shape. Also, when the electrode assembly 10 is accommodated in the accommodation space 1331, the electrolyte is injected. Thereafter, when the upper pouch 131 and the lower pouch 132 may contact each other, and thermal compression is applied to the sealing part, the sealant layers 1343 may be bonded to each other to seal the pouch. Here, since the sealant layer 1343 directly contacts the electrode assembly 10, the sealant layer 1343 may have to have insulating properties. Also, since the sealant layer 1343 contacts the electrolyte, the sealant layer 1343 may have to have corrosion resistance. Also, since the inside of the battery case 13 is completely sealed to prevent materials from moving between the inside and outside of the battery case 13, high sealability has to be realized. That is, the sealing part on which the sealant layers 1343 are bonded to each other has to have superior thermal bonding strength. In general, the second polymer forming the sealant layer 1343 may include at least one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. Particularly, a polyolefin-based resin such as polypropylene (PP) or polyethylene (PE) may be used for the sealant layer 1343. Polypropylene (PP) is excellent in mechanical properties such as tensile strength, rigidity, surface hardness, abrasion resistance, and heat resistance and chemical properties such as corrosion resistance and thus is mainly used for manufacturing the sealant layer 1343. Furthermore, the sealant layer 1343 may be made of a casted polypropylene, an acid modified polypropylene, or a polypropylene-butylene-ethylene terpolymer. Here, the acid-treated polypropylene may be maleic anhydride polypropylene (MAH PP).

The sealant layer 1343 may have a thickness of 30 μm to 100 μm if the sealant layer 1343 is made of polypropylene (PP). If the sealant layer 1343 has a thickness less than 30 μm, the sealant layer 1343 may be deteriorated in durability such as internal breakage during the sealing. On the contrary, if the sealant layer 1343 has a thickness greater than 100 μm, the total thickness of the pouch is thick to increase in volume of the secondary battery and deteriorate in energy density. More preferably, the sealant layer 1343 may have a thickness of 50 μm to 80 μm.

The sealant layer 1343 may have a single layer structure made of any one material or may be provided in plurality. That is, the surface protection layer 1342 may have a composite layer structure which is constituted by layers respectively made of two or more materials. In this case, the plurality of sealant layers 1343 may include a first sealant layer made of acid modified polypropylene (PPa) and formed at the innermost layer and a second sealant layer made of cast polypropylene (CPP) and stacked outside the first sealant layer.

According to one embodiment of the present invention, the pouch film 134 further includes a heat dissipation layer 1344 made of ceramic, stacked between the surface protection layer 1342 and the sealant layer 1343, and releasing heat when a specific pressure is applied.

The heat dissipation layer 1344 is made of ceramic, which absorbs heat and then is converted into another material when a specific pressure is applied to release the absorbed heat to the outside. Here, the ceramic may be lambda titanium pentoxide ($\lambda$-$Ti_3O_5$).

The heat dissipation layer 1344 may be stacked inside the gas barrier layer 1341 as illustrated in FIG. 4. Particularly, it is preferable that one surface of the heat dissipation layer 1344 is stacked in direct contact with the gas barrier layer 1342. As a result, the heat dissipation layer 1344 is disposed between the electrode assembly 10 and the gas barrier layer 1341. Thus, when the electrode assembly 10 increases in thickness, the pressure may be effectively applied to the heat dissipation layer 1344 by the gas barrier layer 1341 made of the metal.

Figure 5:
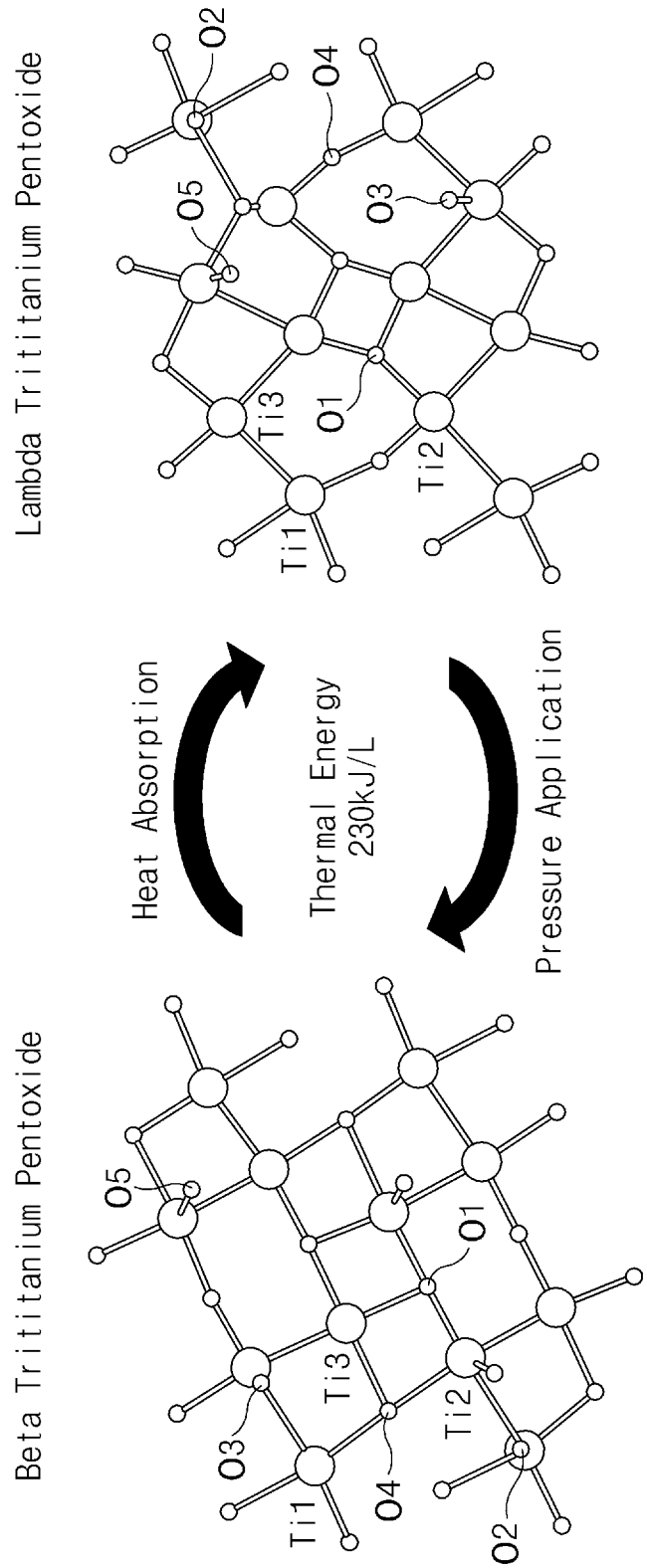
FIG. 5 is a conceptual view of lambda trititanium pentoxide and beta trititanium pentoxide.

FIG. 5 is a conceptual view of lambda trititanium pentoxide and beta trititanium pentoxide.

As illustrated in FIG. 5, lambda titanium pentoxide ($\lambda$-$Ti_3O_5$) may be constituted by only titanium atoms (Ti) and oxygen atoms (O) and may absorb heat of about 230 kJ/L. Also, in a state in which lambda titanium pentoxide absorbs heat and is stored, when a pressure greater than about 60 MPa is applied, lambda titanium pentoxide is converted into beta-titanium pentoxide ($\beta$-$Ti_3O_5$). Here, lambda titanium pentoxide and betatritium pentoxide are different from each other only in the physical bonding structure of the atoms but have constituent materials that are not chemically different from each other.

Lambda titanium pentoxide is pressurized and converted into beta-titanium pentoxide to release the stored heat having about 230 kJ/L to the outside. As a result, the ambient temperature may increase.

As described above, when the over-voltage occurs at a low temperature, the charging current density may increase, and the lithium plating occurs on the anode to increase in thickness of the electrode assembly. Accordingly, there are problems that the pouch type secondary battery increases in total thickness, assembly quality of the secondary battery is deteriorated, and energy efficiency to volume is reduced.

However, according to an embodiment of the present invention, the pouch for the secondary battery may include the heat dissipation layer 1344 made of ceramic containing lambda trititanium pentoxide, and when a pressure is applied, heat may be released to the outside to increase in temperature, thereby preventing the lithium plating from occurring even if the over-voltage occurs at the low temperature.

Beta-titanium pentoxide which releases heat is converted into lambda titanium pentoxide by absorbing surrounding heat again. Therefore, the heat dissipation layer 1344 may continuously repeat the above process.

Figure 6:
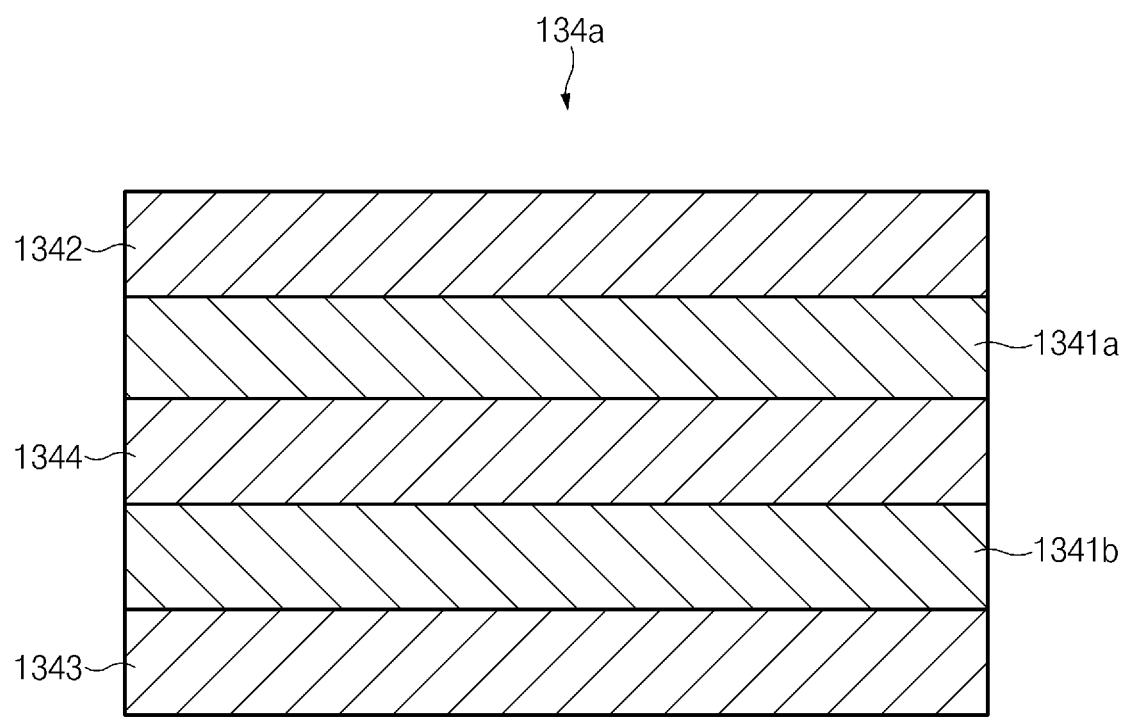
FIG. 6 is a cross-sectional view of a pouch film according to another embodiment of the present invention.

FIG. 6 is a cross-sectional view of a pouch film 134*a* according to another embodiment of the present invention.

In the pouch film 134 according to an embodiment of the present invention, the gas barrier layer 1341 has the single layer structure, and the heat dissipation layer 1344 is stacked inside the gas barrier layer 1341.

However, in the pouch film 134*a* according to another embodiment of the present invention, as illustrated in FIG. 6, a plurality of gas barrier layers 1341*a* and 1341*b* may be provided. That is, the pouch film 134*a* may have a composite layer structure which is constituted by layers respectively made of two or more materials. Even in this case, the plurality of gas barrier layers 1341*a* and 1341*b* may be made of the same kind of metal. That is, the gas barrier layer 1341 may be made of one material or a mixture of two or more materials selected from the group consisting of Fe, Cr, Mn, Ni and Al.

The heat dissipation layer 1344 may be stacked between the plurality of gas barrier layers 1341*a* and 1341*b* as illustrated in FIG. 6. Particularly, it is preferable that both surfaces of the heat dissipation layer 1344 are stacked in direct contact with the gas barrier layers 1341*a* and 1341*b*. As a result, when the electrode assembly 10 increases in thickness, a pressure may be more effectively applied to the heat dissipation layer 1344 by the gas barrier layers 1341*a* and 1341*b* made of metal.

Figure 7:
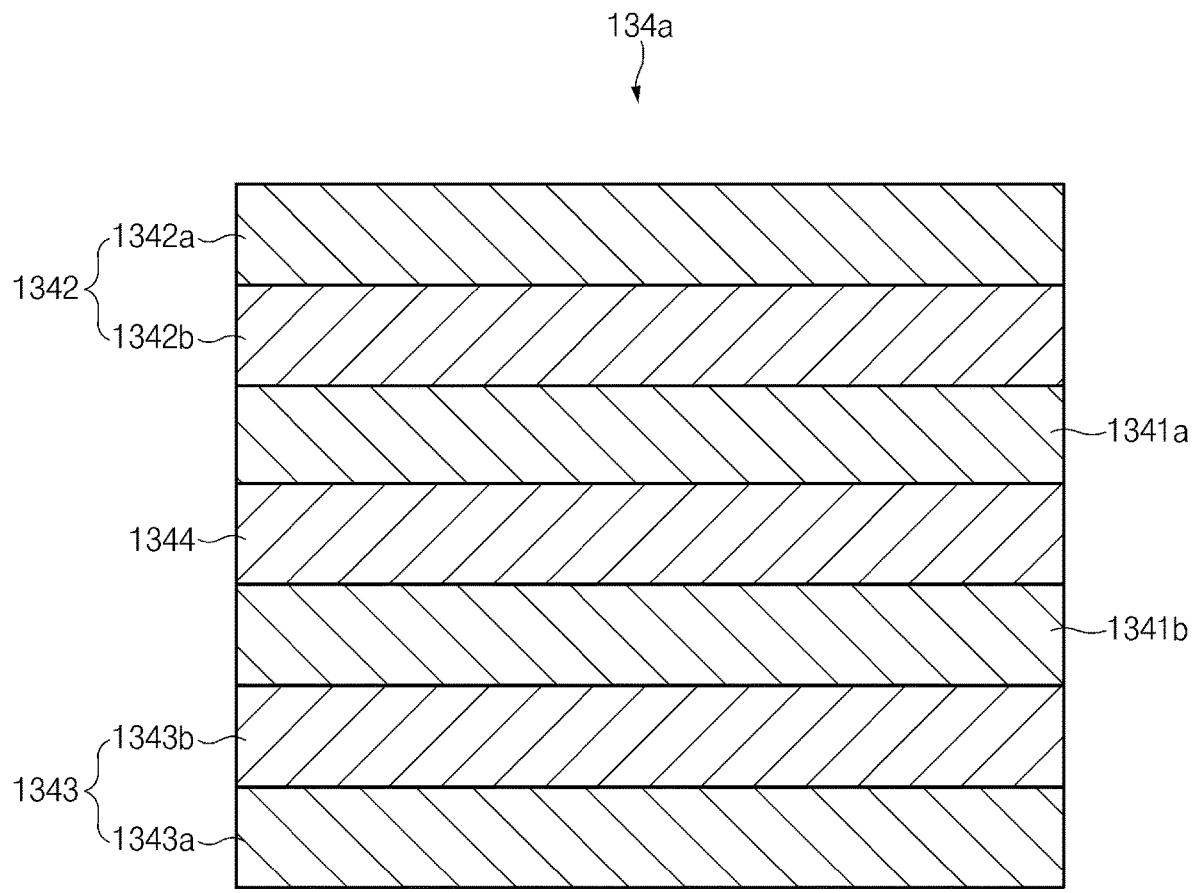
FIG. 7 is a cross-sectional view illustrating a surface protection layer and a sealant layer of the pouch film have a composite film structure according to another embodiment of the present invention.

FIG. 7 is a cross-sectional view illustrating a state in which a surface protection layer 1342 and a sealant layer 1343 of the pouch film 134*a* have a composite film structure according to another embodiment of the present invention.

Even according to another embodiment of the present invention, the surface protection layer 1342 may have a single layer structure made of any one material or may be provided in plurality. That is, the pouch film 134*a* may have a composite layer structure which is constituted by layers respectively made of two or more materials. In this case, the plurality of surface protection layers 1342 may include a first surface protection layer 1342*a* made of polyethylene terephthalate (PET) and formed at the outermost layer and a second surface protection layer 1342*b* made of nylon and stacked inside the first surface protection layer.

The sealant layer 1343 may have a single layer structure made of any one material or may be provided in plurality. That is, the pouch film 134*a* may have a composite layer structure which is constituted by layers respectively made of two or more materials. In this case, the plurality of sealant layers 1343 may include a first sealant layer 1343*a* made of acid modified polypropylene (PPa) and formed at the innermost layer and a second sealant layer 1343*b* made of cast polypropylene (CPP) and stacked outside the first sealant layer.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A pouch for a secondary battery, the pouch comprising:
   a surface protection layer made of a first polymer and forming an outermost layer of the pouch;
   a sealant layer made of a second polymer and forming an innermost layer of the pouch;
   a gas barrier layer consisting of a metal and stacked between the surface protection layer and the sealant layer; and
   a heat dissipation layer consisting of lambda trititanium pentoxide and stacked between the surface protection layer and the sealant layer, the heat dissipation layer being configured to release heat to an outside of the pouch when a predetermined pressure is applied thereto.

2. The pouch of claim 1, wherein the lambda trititanium pentoxide is converted into beta trititanium pentoxide when the predetermined pressure applied to the heat dissipation layer is greater than 60 MPa.

3. The pouch of claim 1, wherein the gas barrier layer is a first gas barrier layer, the pouch further comprising a second gas barrier layer stacked between the surface protection layer and the sealant layer.

4. The pouch of claim 3, wherein the heat dissipation layer is stacked between the first and second gas barrier layers.

5. The pouch of claim 1, wherein the heat dissipation layer is stacked between the gas barrier layer and the sealant layer.

6. The pouch of claim 1, wherein the surface protection layer comprises a first surface protection layer and a second surface protection layer.

7. The pouch of claim 6, wherein the first surface protection layer is made of polyethylene terephthalate (PET) and the second surface protection layer is made of nylon and stacked inside of the first surface protection layer.

8. The pouch of claim 1, wherein the sealant layer comprises a first sealant layer and a second sealant layer.

9. The pouch of claim 8, wherein the first sealant layer is made of acid modified polypropylene (PPa) and the second sealant layer is made of cast polypropylene (CPP) and stacked outside of the first sealant layer.

10. A pouch type secondary battery comprising:
    an electrode assembly in which electrodes and a separator are alternately stacked; and
    a pouch type secondary battery case accommodating the electrode assembly,
    wherein the battery case comprises:
    a surface protection layer made of a first polymer and forming an outermost layer of the battery case;
    a sealant layer made of a second polymer and forming an innermost layer of the battery case;
    a gas barrier layer consisting of a metal and stacked between the surface protection layer and the sealant layer; and
    a heat dissipation layer consisting of lambda trititanium pentoxide and stacked between the surface protection layer and the sealant layer, the heat dissipation layer being configured to release heat to an outside of the battery case when a predetermined pressure is applied thereto.

11. The pouch type secondary battery of claim 10, wherein the gas barrier layer is a first gas barrier layer, the battery case further comprising a second gas barrier layer stacked between the surface protection layer and the sealant layer.

12. The pouch type secondary battery of claim 11, wherein the heat dissipation layer is stacked between the first and second gas barrier layers.

\* \* \* \* \*